United States Patent [19]

Wilke

[11] Patent Number: 5,588,510
[45] Date of Patent: Dec. 31, 1996

[54] VARIABLE DAMPING FORCE SHOCK ABSORBER

[75] Inventor: Raud A. Wilke, Dousman, Wis.

[73] Assignee: HUSCO International, Inc., Waukesha, Wis.

[21] Appl. No.: 533,234

[22] Filed: Sep. 25, 1995

[51] Int. Cl.[6] .................................................. F16F 9/46
[52] U.S. Cl. ................ 188/299; 188/322.13; 188/318; 188/314; 188/315; 280/707
[58] Field of Search ................................. 188/299, 318, 188/316, 317, 315, 281, 282, 322.13; 280/707, 714

[56] References Cited

U.S. PATENT DOCUMENTS

| | | | |
|---|---|---|---|
| 3,807,678 | 4/1974 | Karnopp et al. | 248/358 R |
| 4,786,034 | 11/1988 | Heess et al. | 267/64.15 |
| 4,821,849 | 4/1989 | Miller | 188/280 |
| 4,902,034 | 2/1990 | Maguran et al. | 280/707 |
| 4,948,163 | 8/1990 | Kikushima et al. | 280/707 |
| 5,098,119 | 3/1992 | Williams et al. | 280/707 |
| 5,102,161 | 4/1992 | Williams | 280/707 |
| 5,145,206 | 9/1992 | Williams | 280/707 |
| 5,205,581 | 4/1993 | Kallenbach et al. | 280/714 |
| 5,324,066 | 6/1994 | Masamura et al. | 280/707 |
| 5,324,068 | 6/1994 | Kallenbach et al. | 280/707 |
| 5,375,683 | 12/1994 | Huang et al. | 188/318 |
| 5,392,885 | 2/1995 | Patzenhauer et al. | 188/299 |
| 5,431,259 | 7/1995 | Mizutani et al. | 188/299 |

Primary Examiner—Douglas C. Butler
Attorney, Agent, or Firm—Quarles & Brady

[57] ABSTRACT

A semi-active vehicle suspension system employing a shock absorber whose damping characteristics are variable under the control of a signal representing one or more conditions of the vehicle. The system employs a coaxially arranged valve pair to provide one or two fluid flow paths between a chamber of the shock absorber and a reservoir. Two of such coaxial valve pairs may be used in tandem to control both chambers of the shock absorber in an inverse relationship. Both of the tandem pairs may be controlled by a single spool which is controlled by a single control signal.

22 Claims, 4 Drawing Sheets

VARIABLE DAMPING FORCE SHOCK ABSORBER

FIELD OF THE INVENTION

The invention relates to semi-active vehicle suspension systems which employ a shock absorber whose damping characteristics are variable under the control of one or more signals representing one or more operating conditions of the vehicle.

BACKGROUND

Vehicle suspension systems are provided to control the relative motion between the vehicle chassis and its wheels. Such systems try to isolate the body of the vehicle from vibrations and bumps resulting from road irregularities and to resist inertial roll and pitch motions of the body which result from braking, accelerating and cornering. There is a tension between achieving both of these objectives because vibration isolation requires a relatively low opposing force (i.e, the damping should be relatively "soft") and inertial resistance requires a relatively high opposing force (i.e, relatively "hard" damping).

Active and semi-active systems have been developed to overcome this limitation. They employ sensors to measure various vehicle and/or wheel conditions and a microprocessor to interpret the sensor data in order to provide one or more control signals which continually adjust each shock absorber on the vehicle in response to the operating conditions at any point in time.

Active systems include a hydraulic pump controlled by the control signals. The pump powers an apparatus which actually moves the wheels up and down independently of the motion inputs from the vehicle body and the wheels. While such active systems can provide excellent performance, they are costly and heavy and use a significant amount of the energy produced by the vehicle engine.

Semi-active systems have been devised to overcome these problems. They provide some controlled variability to the typical type of passive shock absorber which employs a piston and cylinder assembly having chambers of variable volume which are connected by an orifice through which hydraulic fluid is displaced. In such a device, the cross sectional area of this orifice determines the force exerted by the shock absorber in resistance to the pressure force created in one of the chambers as a result of relative motion between the vehicle body and the wheels.

In a passive system, the size of the inter-chamber orifice is fixed. Thus the system is set at a compromise point on the hardness/softness spectrum so that it is less than ideal for achieving both objectives of vibration isolation and inertial resistance. Further, the shock absorber's resistive force (which is proportional to the pressure drop across the orifice) is proportional to the flow rate through the orifice, which varies positively with the input pressure—i.e., the shock absorber hardens as input pressure increases and softens as it decreases, which may be contrary to the desired result.

Like an active system, a semi-active system employs control signals to control the performance of the suspension system. It does not, however, employ a pump. Rather, in a semi-active system the control signals constantly change the area of the inter-chamber orifice through which the hydraulic fluid in the piston/cylinder assembly flows in response to wheel and body movements. These changes adjust the shock absorber's point on the hardness/softness spectrum to that which is the most appropriate for the conditions at each moment.

Semi-active shock absorbers generally employ an electrically powered actuator (such as a solenoid) to vary the area of the orifice in response to the control signals. If the actuator had to control an orifice in the main flow path between the chambers, it would have to be large and strong enough to handle very substantial forces which would result from a high flow rate. As a result, it would be costly, bulky and heavy, and it would consume significant amounts of electrical power. To reduce this problem, it is known to have the actuator vary an orifice in a pilot passage which controls the main valve. See U.S. Pat. No. 4,902,034, Feb. 20, 1990, Maguran et al. In such an apparatus, the resistive force can be made substantially independent of flow rate, once a small minimum flow rate has been exceeded. As a result, the resistive force depends almost entirely on the level of electrical current input to the actuator. There is, however, a need for a simpler, more compact and less expensive semi-active system employing a pilot circuit.

In most driving situations, the inter-chamber orifice of a semi-active system will be opening and closing only slightly. Nonetheless, it must be large and strong enough to handle the high flow rates which may be needed in other situations. In those typical driving situations, this size tends to slow the moment-to-moment response and to consume more power than would otherwise be necessary. Therefore, there is a need for a system which provides faster response and uses less power in the routine driving situation.

It is often desirable that the compression chamber (i.e., the chamber between the piston and the vehicle body) and the rebound chamber (i.e., the chamber between the piston and the wheel) be at different points of the hardness/softness spectrum. For example, relatively hard damping in the compression chamber and relatively soft damping in the rebound chamber would be desirable on the right shock absorbers when the car swerved left. The hard compression chamber would prevent the car's right side from pitching down sharply and the soft rebound chamber would allow the car to quickly recover from any pitch that did occur. Conversely, in a sharp left turn, the left shock absorber should be in hard rebound and soft compression in order to cooperate to achieve the same result. Thus, in many driving situations, it is desirable to control both the compression and the rebound chamber such that to the extent that one is hard the other is correspondingly soft, and vice versa. There is a need for a system which can accomplish this result simply and economically.

SUMMARY

The present invention is directed to an apparatus that satisfies these needs.

The invention provides a shock absorber for variably damping the transmission of forces between a body of a vehicle and a suspension member supporting a road wheel. The vehicle is of the type which has an apparatus for sensing one or more operating conditions and transmitting one or more control signals which are indicative of the operating conditions. The shock absorber has a housing which is adapted for connection to the vehicle body or the suspension member and which defines an internal space. Disposed within the internal space is a movable piston which is adapted for connection to the other of the vehicle body and the suspension member and which divides the internal space into a first working chamber and a second working chamber.

The working chambers contain a working fluid. There is an assembly of a threshold valve and a main valve which are adapted to supplementarily control the flow of fluid from the first working chamber to a receiving chamber. The threshold valve and the main valve have front sides subject to the pressure in the first working chamber and opposite back sides. A pilot fluid path extends from the front sides of the threshold and main valves to the back sides. A pilot circuit provides fluid communication from the pilot fluid path through a variable orifice to the receiving chamber. There is an orifice modifier which is adapted to vary the size of the variable orifice in the pilot circuit. An actuator remotely controlled by the one or more control signals operates the orifice modifier. Means are provided for providing for a complete circuit of the fluid among the working chambers and the receiving chamber. In accordance with the invention, varying the cross sectional area of the variable orifice varies the pressure on the back sides of the threshold valve and the main valve and thereby varies the amount of pressure in the first working chamber needed to open the threshold valve and the main valve.

In different aspects of the invention, the receiving chamber may be a reservoir or the second working chamber. In yet another aspect, the threshold valve and the main valve provide parallel first and second fluid paths to the receiving chamber. The orifice modifier may be a spool-type proportional valve and the remotely controlled actuator is a solenoid controlled by the one or more control signals.

In another aspect of the invention, the threshold valve and the main valve are arranged coaxially, and they may be axially bored such that their axial bores are aligned to provide the pilot fluid path.

In still another aspect of the invention, the threshold valve and the main valve are poppet valves having a threshold poppet and a main poppet respectively and are telescopically arranged so that the threshold poppet moves reciprocally and relatively within the main poppet. The threshold poppet and the main poppet may be axially bored so that their axial bores are aligned to provide the pilot fluid path. In addition, the front and back sides of the threshold valve and the main valve are sized, and the threshold valve and the main valve are biased, so that, when the variable orifice is substantially closed, increasing pressure in the first work chamber unseats the main poppet but not the threshold poppet and, when the variable orifice is not substantially closed, increasing pressure in the first work chamber first unseats the threshold poppet and then the main poppet.

In a further aspect of the invention, there are two valve assemblies adapted respectively to control the flow of fluid from the first working chamber to a first receiving chamber and from the second working chamber to a first receiving chamber. The valve assemblies have a front side subject to the pressure in the first and second working chambers respectively and an opposite back side. There are a pair of pilot fluid paths from the front sides to the back sides respectively. A pilot circuit provides fluid communication from the first pilot fluid path through a first variable orifice to the first receiving chamber and from the second pilot fluid path through a second variable orifice to the second receiving chamber. An orifice modifier apparatus can vary the sizes of the first and second variable orifices. An important feature of this aspect of the invention is that the orifice modifier apparatus is inversely ganged so that any orifice modifying operation both enlarges one of the first and second variable orifices and reduces the other of the first and second variable orifices. The orifice modifier apparatus may be a single spool-type proportional valve having the structures to modify both the first variable orifice and the second variable orifice such that moving the spool in one direction enlarges one of the orifices and reduces the other and moving the spool in a reciprocal direction reduces the one of the orifices and enlarges the other. The first and second receiving chambers may be a reservoir, or the first receiving chamber may be the second working chamber and the second receiving chamber may be the first working chamber. The valve assemblies may each comprise a threshold valve and a main valve adapted to act supplementarily.

It will be recognized, that the invention provides a relatively simple, compact and low-energy shock absorber capable of inversely controlling the damping characteristics of both chambers with one electro-magnetic valve controlled by one control signal.

These the other objects and advantages of the invention will be apparent from the description which follows. The preferred embodiments will be described in reference to the accompanying drawings. These embodiments do not represent the full scope of the invention, but rather the invention may be employed in other embodiments. Reference should therefore be made to the claims herein for interpreting the breadth of the invention.

DESCRIPTION OF THE PREFERRED EMBODIMENT

Figure 1:
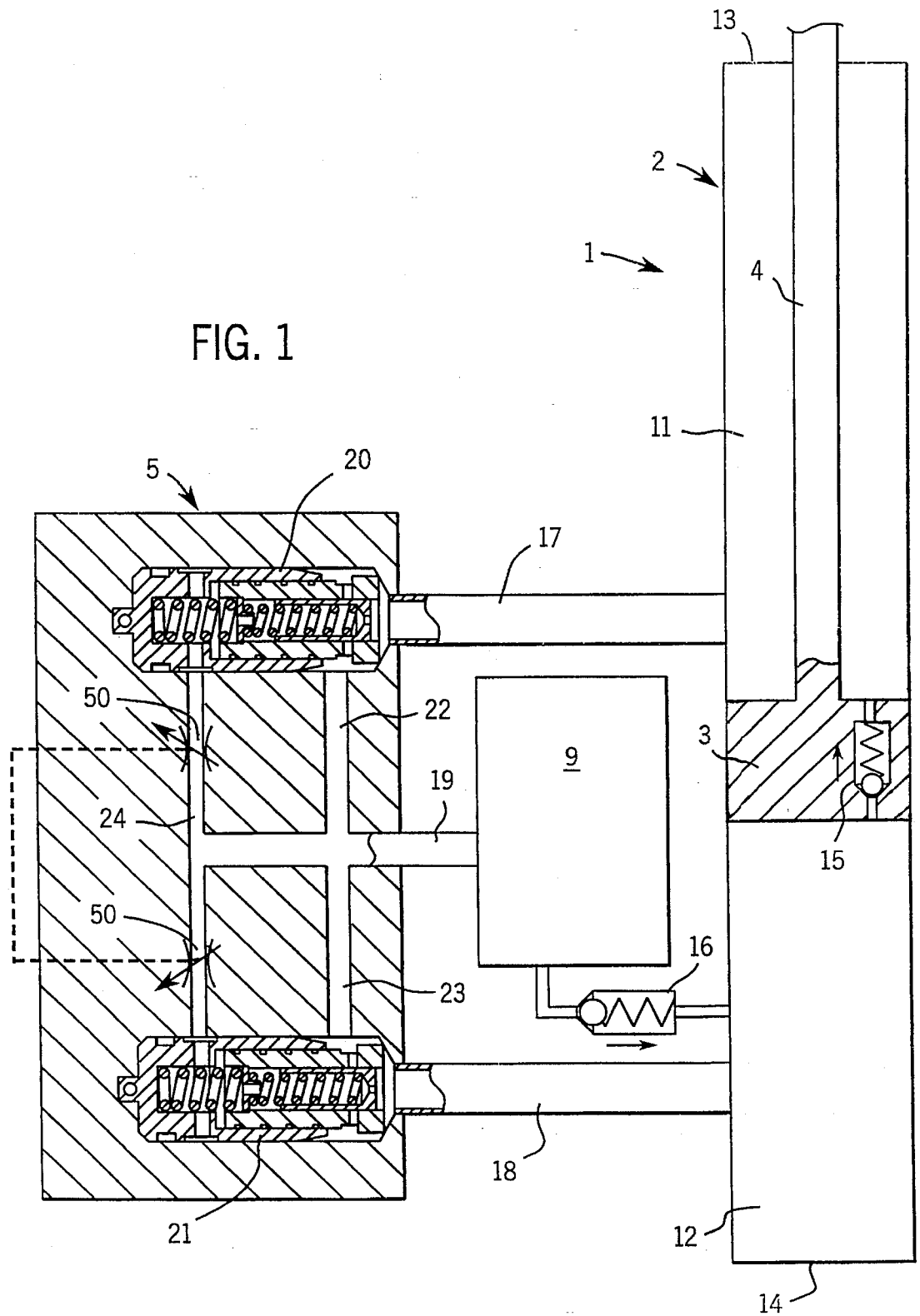
FIG. 1 is a schematic representation of a shock absorber embodiment of the present invention.

In the description which follows, vertical terms (e.g., vertical, upper, lower) refer to the orientation shown in the drawings, which are not necessarily the actual orientation in the embodiment when in use.

Figure 2:
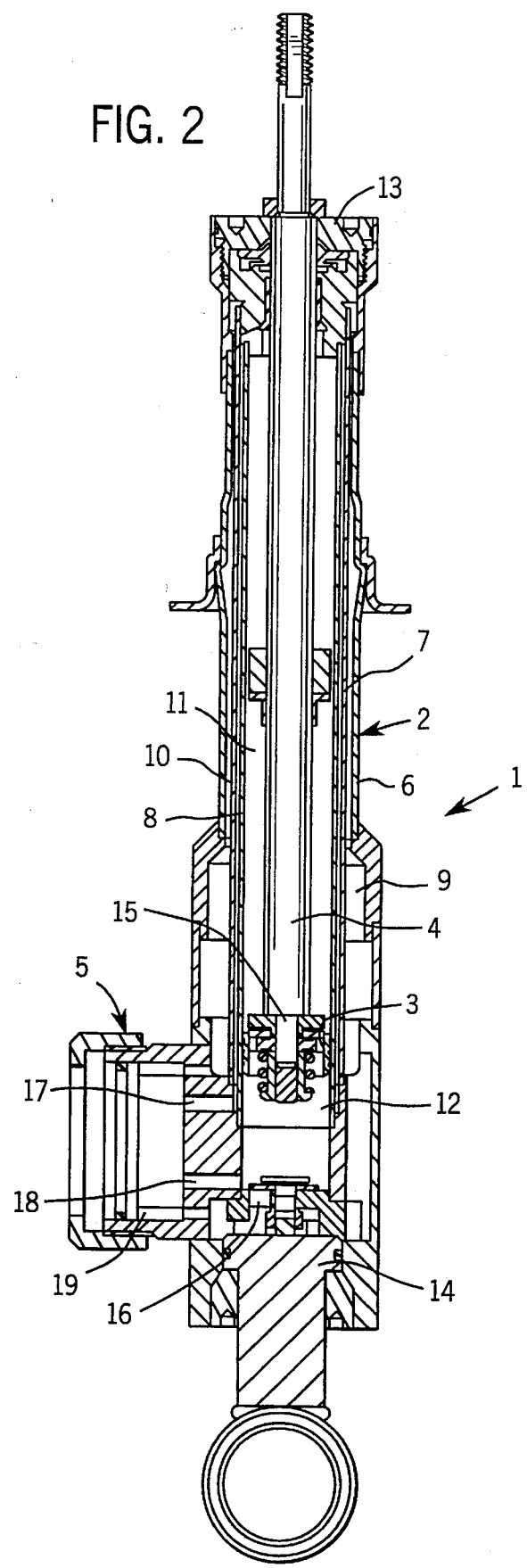
FIG. 2 is a cross-sectional view of a telescopic-type shock absorber tube to which is attached a twin valve assembly.

FIG. 2 depicts a telescope-type shock absorber assembly 1 whose main parts comprise a cylindrical housing 2, a piston 3 within the housing 2 carried on a rod 4 and a twin valve assembly 5 attached to the housing 2. The housing 2 comprises three coaxial cylinders which define a reservoir 9 between the outer 6 and the medial 7 cylinders and a conduit 10 between the medial 7 and the inner 8 cylinders. The piston 3 is sealingly but slidably engaged with the inner surface of the inner cylinder 8 and divides the inner cylinder 8 into a first working chamber 11 above the piston 3 and a second working chamber 12 below the piston 3.

The rod 4 carrying the piston 3 sealingly but slidingly extends through the capped upper end 13 of the shock absorber assembly 1 and is connected to a vehicle body (not shown) in a conventional way. The lower capped end 14 of the shock absorber assembly 1 is connected to a suspension member (not shown) rotatably supporting a road wheel. Accordingly, vibrations or forces which move the vehicle body and the suspension member toward each other ("compression") drive the piston 3 further into the inner cylinder 8, thereby reducing the volume of the second working chamber 12 and increasing the volume of the first working chamber 11. Forces which move the vehicle and the suspension member apart ("rebound ") cause the piston 3 to retreat, thereby expanding the second working chamber 12 and reducing the volume of the first working chamber 11.

The first working chamber 11 and the second working chamber 12 are substantially filled with a working fluid, such as hydraulic oil. The piston 3 is provided with a piston check valve 15 which permits fluid to flow from the second working chamber 12 through the piston check valve 15 and into the first working chamber 11, but does not permit fluid to flow in the opposite direction. The lower capped end 14 of the housing 2 includes an end check valve 16 which permits fluid to flow from the reservoir 9 to the second working chamber 12, but does not permit flow in the opposite direction. There is a first transfer passage 17 which establishes fluid communication between the twin valve assembly 5 and the first working chamber 11 via the conduit 10 defined between the inner 8 and the medial 7 cylinders. There is a second transfer passage 18 which allows fluid flow between the twin valve assembly 5 and the second working chamber 12. A reservoir passage 19 provides for fluid flow from the twin valve assembly 5 to the reservoir 9.

In a compression, the increased pressure in the second working chamber 12 and the decreased pressure in the first working chamber 11 causes the fluid to flow through the second transfer passage 18 into the twin valve assembly 5 and (as will be described below) thence to the reservoir 9. Fluid can also flow from the second working chamber 12 into the first working chamber 11 through the piston check valve 15. In a rebound motion, the increased pressure in the first working chamber 11 causes fluid to flow through the first transfer passage 17 into the twin valve assembly 5 and thence to the reservoir 9. The reduced pressure in the second working chamber 12 draws fluid from the reservoir 9 through the end check valve 16 and into the second working chamber 12.

As shown schematically in FIG. 1, the first transfer passage 17 opens in the twin valve assembly 5 to a coaxially arranged threshold valve and main valve combination, the first coaxial valve pair 20. Similarly, the second transfer passage 18 opens into a second coaxial valve pair 21. As shown schematically in FIG. 1, a first linking passage 22 within the twin valve assembly 5 links the first transfer passage 17 with the reservoir passage 19 via the first coaxial valve pair 20, and a second linking passage 23 links the second transfer passage 18 with the reservoir passage 19 via the second coaxial valve pair 21. A variable pilot circuit 24 biases the coaxial valve pairs 20, 21 toward closure in a way which will be discussed below.

FIG. 3 illustrates one embodiment of the coaxial valve pairs 20, 21, in each of four operational states.

Each coaxial valve pair 20, 21 is housed in a bore ("assembly bore 25 ") in the twin-valve assembly. In the assembly bore 25 there is secured a sleeve 26 whose bore ("sleeve bore 27 ") has a lower wide portion 28 which is open ended and an upper, narrower portion 29 which is closed. The boundary between the wide and narrow portions defines a shoulder 30. In the wide portion of the sleeve bore 27, the main poppet 31 slides axially. In the narrow portion of the sleeve bore 27, there is a main poppet spring 32 which is compressed between the capped end of the sleeve 26 and a spring retainer 33 affixed to the main poppet 31, thereby biasing the main poppet 31 downward—i.e., toward closure. The lower end of the assembly bore 25 narrows in joining the transfer passage 17, 18, and this narrowed portion forms a seat 34 against which the main poppet 31 rests when in a closed position.

The main poppet 31 is itself a sleeve, open at both ends. It has a stepped axial bore ("main poppet bore 35 ") having at the bottom the narrowest portion 36, which widens at the first step 37 into a medial portion 38, which widens at the second step 39 into the upper, widest portion 40. On the second step 39 is affixed a washer-like spring retainer 33, which supports the main poppet spring 32.

In the medial portion 38 of the main poppet bore 35, there axially slides the threshold poppet 41 in a telescopic arrangement. The threshold poppet 41 is also a sleeve, having an axial bore ("threshold poppet bore 42 ") which is open at the top and which narrows into a relatively small pilot channel 43 ("pilot fluid path ") at the bottom. The threshold poppet 41 is biased downwards toward closure by a threshold poppet spring 44 which is compressed between the top of the threshold poppet 41 and the bottom of the spring retainer 33. When closed, the bottom of the threshold poppet 41 rests on its seat 45, which is the first step 37 of the main poppet bore 35.

There is a first cross bore 46, which extends laterally through the main poppet 31 below the sleeve 26. It is in fluid communication with the reservoir passage 19, which leads to the reservoir 9.

There is a second cross bore 47, which extends laterally through the sleeve 26 above the main poppet 31. It is in fluid communication with the variable pilot circuit 24 (see FIG. 1).

As used in the claims, the term "front side " refers to the areas presented respectively to the transfer passage 17, 18 by the main valve and the threshold valve and their respective poppets; in the perspective of FIG. 3, they are at the bottom. The term "back side " refers to the opposite areas of these elements, the side presented to the variable pilot circuit 24.

The variable pilot circuit 24 consists of the following path: transfer passage (first 17 or second 18, as the case may be); pilot channel 43 of the threshold poppet 41; the threshold poppet bore 42; the narrow portion of the sleeve bore 27; the second cross bore 47; a variable orifice 50 (see FIG. 1); the reservoir passage 19; the reservoir 9. The pilot circuit 24 is sized to allow relatively little flow of fluid, and the narrowness (or complete closure) of the variable orifice 50 creates a backpressure which biases both the main poppet 31 and the threshold poppet 41 toward closure. Specifically, when the variable orifice 50 is closed, the only fluid flow is through minor leakage.

In this almost zero flow condition, the pressure throughout the entire pilot circuit 24 is almost constant. As a result, the pressures acting on both sides of the threshold poppet 41 are approximately equal, and they act on approximately equal areas, with the result that the opposing pressure forces offset each other and that the threshold poppet 41 is held closed by the threshold poppet spring 44, which is relatively strong.

Figure 3A:
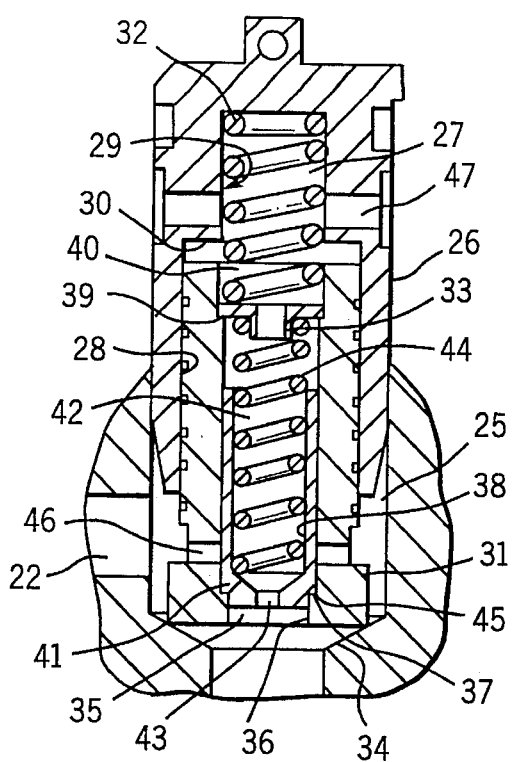
FIG. 3 are cross-sectional views of a coaxial valve pair in four different states of operation.
Figure 3B:
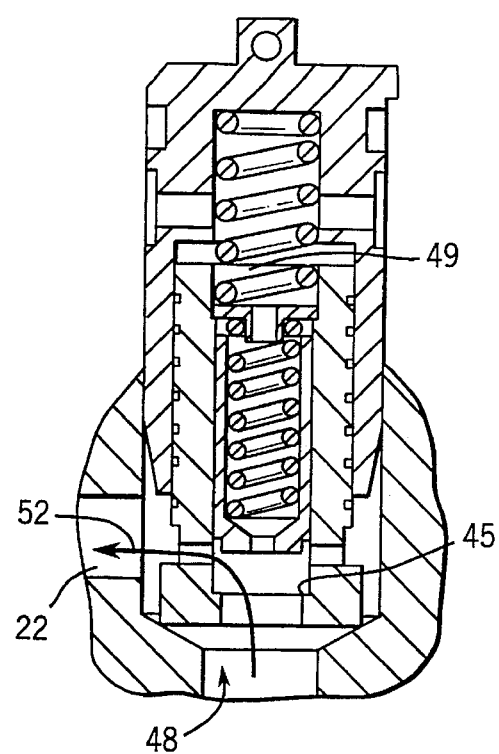
Figure 3C:
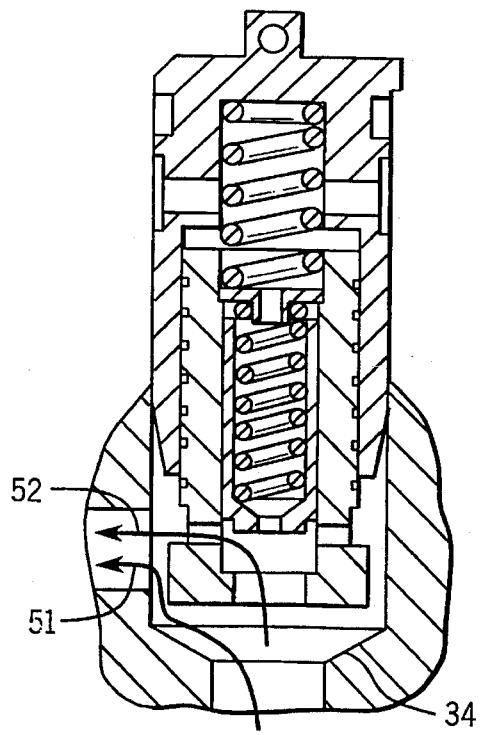
Figure 3D:
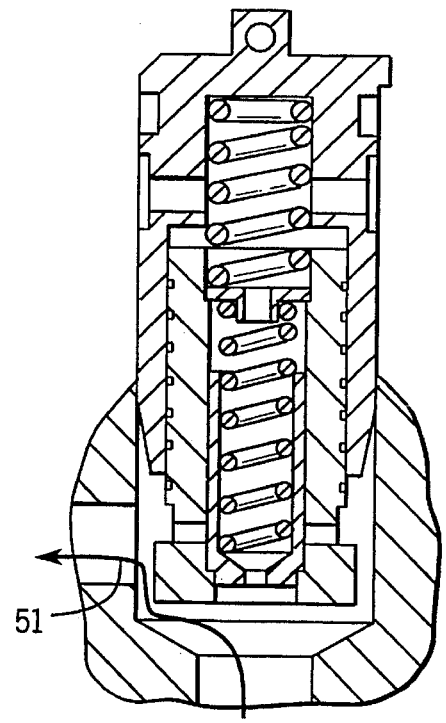

In this condition (i.e., the variable orifice 50 being closed), the pressures on both sides of the main poppet 31 are approximately equal. The front side 48 of the main poppet 31 has a slightly larger area than that of the back side 49. As a result, an increase in the transfer passage pressure creates a small net opening force which acts in opposition to the main poppet spring 32. The areas and the spring are designed so that the transfer passage pressure must build up to a relatively high level before the main poppet 31 opens and permits fluid in the transfer passage 17, 18 to flow relatively freely to the reservoir 9 along the path ("main poppet flow path 52 ") illustrated in FIG. 3(d): transfer passage 17, 18; between the main poppet seat 34 and the bottom of the main poppet 31; reservoir passage 19; reservoir 9. As shown in FIG. 3(d), the threshold poppet remains closed. In this state, when the variable orifice 50 is closed, the coaxial valve pair 20, 21 is in the "hard " mode.

When the variable orifice 50 is maximally open, the coaxial valve pair 20, 21 is in the "soft " mode. The opening of the variable orifice 50 relieves the pressure on the top of the threshold poppet. As a result, a relatively low pressure in the transfer passage 17, 18 will provide sufficient force to overcome the opposing forces produced by the threshold poppet spring 44 and the pressure on the top of the threshold poppet. When that happens, the fluid flow ("threshold poppet fluid flow path ") is as illustrated in FIG. 3(b): from the transfer passage 17, 18; between the first step 37 of the main popper bore 35 and the bottom of the threshold poppet 41; through the first cross bore 46; and into the reserve passage.

As the transfer passage pressure increases, the threshold poppet 41 continues to open, thereby continuing to increase the rate of fluid flow. As the transfer passage pressure increases further, the force it exerts on the front side 48 of the main poppet 31 exceeds the sum of the main poppet's 31 spring force and the pressure force on the back side 49 of the main poppet 31. The pressure force on the top of the main poppet 31 is less than in the hard mode because of the pressure drop created by the fluid flow allowed by the threshold poppet 41. Accordingly, the threshold poppet 41 acts like a second pilot valve controlling the main poppet 31. Therefore, as the transfer passage pressure increases, the main poppet 31 opens, allowing substantial fluid flow through the main poppet flow path 51, thus supplementing the flow in the threshold poppet flow path 52. As illustrated in FIG. 3(c), in the soft mode there are two parallel paths 51, 52 from the transfer passage 17, 18 to the reservoir 9: the threshold poppet flow and the main poppet flow 52.

When the variable orifice 50 is in an intermediate position between fully opened and fully closed, the two stage opening of the threshold poppet 41 and the main poppet 31 described in the preceding paragraph will occur. However, the pressure at which the main poppet 31 begins to open will be greater than in the fully soft mode (when the variable orifice 50 is fully opened) and less than in the fully hard mode (when the variable orifice 50 is fully closed). Controlling the size of the variable orifice 50 therefore controls the pressure at which the main poppet 31 will open and allow relatively free flow of fluid from a shock absorber working chamber 11, 12 to the reservoir 9.

When the main poppet 31 opens, it allows substantially free flow of the fluid—i.e, the pressure drop across the coaxial valve pair 20, 21 increases very little with compression of the applicable working chamber 11, 12. Thus, the resistive force provided by the coaxial valve pair 20, 21 remains substantially independent of flow rate and constant at the level at which the main poppet 31 opened. Therefore, the size of the variable orifice 50 sets a substantially constant resistive force—i.e, it establishes a substantially constant point on the hardness/softness spectrum.

The variable orifice 50 can be provided by a variety of orifice modifiers operated by an actuator controlled remotely by control signals from one or more sensors of vehicle operating conditions. The solenoid controlled, spool-type proportional valve described below is one of the possible variable orifice arrangements, but not the only one.

The coaxial valve pair 20, 21 described above can be used alone to provide variable damping for one of the working chambers 11, 12 of the shock absorber. It can also be used in a tandem with another coaxial valve pair 20, 21 to provide differentiated variable damping in each of the two working chambers 11, 12 of the shock absorber. In such a tandem arrangement, the two coaxial valve pairs 20, 21 can be independently controlled, or they can ganged as in the embodiment now to be discussed.

A ganged tandem arrangement is shown in schematic form in FIG. 1. An embodiment of the ganged tandem arrangement is illustrated in FIGS. 4 and 5.

Figure 4:
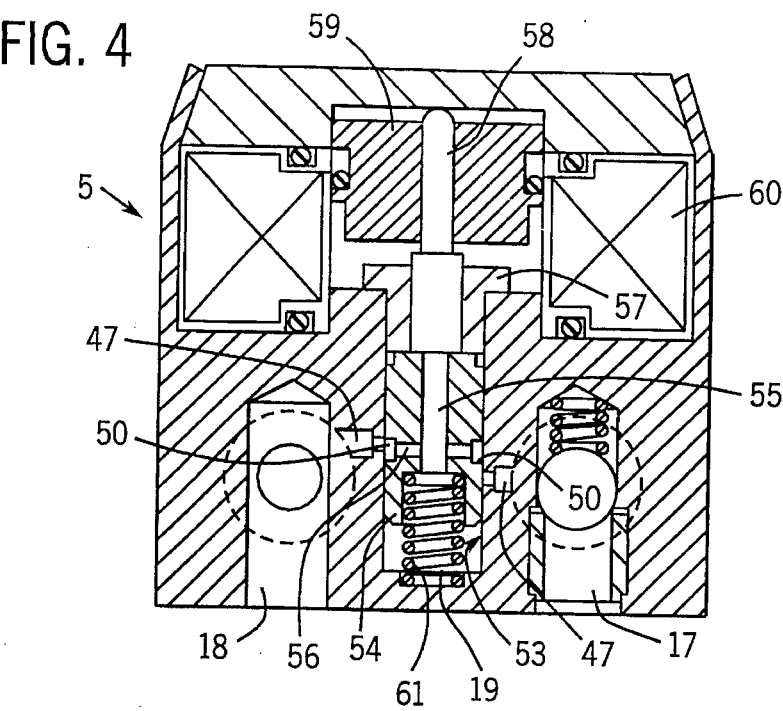
FIG. 4 is a cross-sectional view of a twin valve assembly in a plane perpendicular to the plane of the view of FIG. 3.
Figure 5:
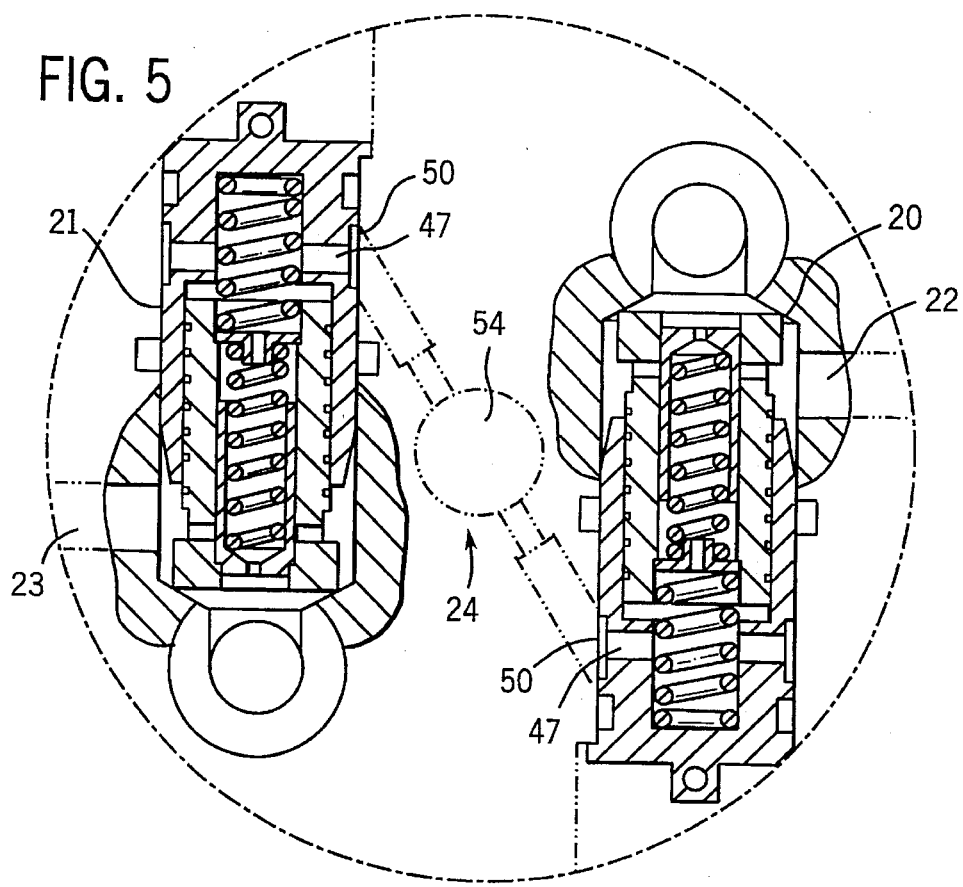
FIG. 5 is a schematic cross-sectional view, in a plane parallel to that of FIG. 3, of tandem coaxial valve pairs in a twin valve assembly.

In the embodiment illustrated in FIGS. 4 and 5, the twin valve assembly 5 contains two of the coaxial valve pairs 20, 21, arranged horizontally and in parallel. Bores in the twin valve assembly 5 provide the passages illustrated schematically in FIG. 1—the first and second transfer passages 17, 18, the reservoir passage 19 and the pilot circuit 24. The twin valve assembly 5 has a vertical spool bore 53 in which a spool 54 slides reciprocally. The second cross bore 47 of each of the coaxial valve pairs 20, 21 opens into the vertical spool bore 53, which is in fluid communication with the reservoir passage 19.

The spool 54 has a longitudinal bore 55 which at the top is closed and at the bottom is in fluid communication with the spool bore 53 and thus with the reservoir passage 19 (see FIG. 1). The spool 54 also has a cross bore 56 intersecting orthogonally with the longitudinal spool bore 55. The openings of the spool cross bore 56 in the outer surface of the spool 54 are aligned to pass across the openings of the second cross bores 47 of the coaxial valve pairs 20, 21 as the spool 54 moves. The second cross bores 47 of the coaxial valve pairs 20, 21 are longitudinally offset from each other by virtue of the reverse positioning of the two coaxial valve pairs 20, 21 in the twin valve assembly 5, as shown in FIG. 5. These components are dimensioned and positioned so that, as the spool 54 moves vertically, the spool cross bore 56 is first aligned with neither second cross bore 47 of the coaxial pairs; then with one and not the other; then with both; and finally again with neither.

The junction of the spool cross bore 56 with a second cross bore 47 of a coaxial valve pair 20, 21 forms a variable orifice 50 in the pilot circuit 24 of that coaxial valve pair 20, 21. The size of that variable orifice 50 is determined at any time by the extent of the alignment between the second cross bore 47 and the spool cross bore 56. This alignment is determined by the longitudinal position of the spool 54, the control of which is discussed below. It should be noted here, however, that controlling the movement of one part, the spool 54, controls both variable orifices 50 in the tandem arrangement and thus, in the manner described above, controls the damping level of both of the coaxial valve pairs 20, 21.

To the top of the spool 54 there is affixed an armature assembly consisting of a flanged bearing 57 which facilitates sliding, a vertically extending push pin 58 and a ferromagnetic block 59. A solenoid coil 60 surrounds the armature assembly. A solenoid spring 61 at the bottom of the spool 54 biases the spool 54 and its attached armature assembly upward. When the solenoid coil 60 carries electrical current, it creates a magnetic field which draws the spool assembly downward. The amount of the current determines the position of the spool 54. For example, in one embodiment, if one-third of the maximum rated current flows in the coil 60, the spool 54 is positioned so that the first variable orifice 50 is closed and the second variable orifice 50 is fully open—i.e., one of the shock absorber's working chambers 11, 12 is "hard " and the other is "soft." If the current is two-thirds maximum, the situation is reversed. At any current level in between one-third and two-thirds, each variable orifice 50 is partially open. At those current levels (except at 50% maximum current, when each variable orifice 50 is approximately half open), the size of one of the variable orifices 50 is approximately the inverse of the other—i.e., to the extent that one working chamber 11, 12 is hard, the other is soft. At 50% maximum current, each working chamber 11, 12 is soft to the same degree.

The level of current in the solenoid coil 60 is controlled by an on-board microprocessor (not shown) which receives the output of several accelerometers or other motion measuring devices. At very rapid intervals, the microprocessor analyses these signals according to a program and generates control signals which establish a current level in the solenoid coil 60 of each shock absorber on the vehicle. This current level moves the spool 54 of each shock absorber to a position which yields the degree of hardness and softness in both working chambers 11, 12 that, according to the program of the microprocessor, is optimum for damping vibration and bumps and for stabilizing the roll and pitch of the automobile.

Thus, one spool 54 controls the damping characteristic of both working chambers 11, 12 of a shock absorber. This control of two working chambers 11, 12 may be achieved by only one control signal per shock absorber. The working chambers 11, 12 will either be on the same point on the hardness/softness spectrum (which will typically be the case in most driving situations) or will be at different positions which are inversely related (which is desirable to maintain a level vehicle attitude in inertial roll or pitch situations). All of this is achieved with a relatively simple, compact and inexpensive apparatus which does not require excessive power.

Although the preferred embodiments of the invention have been described above, the invention claimed is not so restricted. There may be various modifications and changes to these embodiments which are within the scope of the invention. For example, the threshold and main valve combination need not necessarily be arranged coaxially or telescopically and, in certain embodiments, the threshold and main valve combination may be replaced with a valve assembly having a single valve member. In addition, the telescope-type shock absorber could employ a rod in both working chambers 11, 12 and thereby eliminate the need for a reservoir 9. Further, a coaxial valve pair arrangement could be employed with a different type of shock absorber. Thus, the invention is not limited by the specific description above, but should be judged by the claims which follow.

I claim:

1. A shock absorber for variably damping the transmission of forces between a body of a vehicle and a suspension member supporting a road wheel, the vehicle being of the type which has an apparatus for sensing one or more operating conditions and transmitting one or more control signals which are indicative of the operating conditions, the shock absorber comprising:

(a) a housing adapted for connection to one of the vehicle body and the suspension member and defining an internal space, and a piston adapted for connection to the other of the vehicle body and the suspension member and disposed within the internal space for dividing the internal space into a first working chamber and a second working chamber and for moving relative to the housing, the working chambers containing a working fluid;

(b) an assembly of a threshold valve and a main valve adapted to supplementarily control the flow of fluid from the first working chamber to a receiving chamber, the threshold valve and the main valve having front sides subject to the pressure in the first working chamber and opposite back sides;

(c) a pilot fluid path from the front sides of the threshold and main valves to the back sides;

(d) a pilot circuit providing fluid communication from the pilot fluid path through a variable orifice to the receiving chamber;

(e) an orifice modifier adapted to vary the size of the variable orifice in the pilot circuit;

(f) a remotely controlled actuator adapted to operate the orifice modifier, the actuator being controlled by the one or more control signals;

(g) means for providing for a complete circuit of the fluid among the working chambers and the receiving chamber;

(h) whereby varying the cross sectional area of the variable orifice varies the pressure on the back sides of the threshold valve and the main valve and thereby varies the amount of pressure in the first working chamber needed to open the threshold valve and the main valve.

2. A shock absorber as recited in claim 1, wherein the receiving chamber is a reservoir.

3. A shock absorber as recited in claim 1, wherein the receiving chamber is the second working chamber.

4. A shock absorber as recited in claim 1, wherein the threshold valve and the main valve provide parallel first and second fluid paths to the receiving chamber.

5. A shock absorber as recited in claim 1, wherein the threshold valve and the main valve are arranged coaxially.

6. A shock absorber as recited in claim 5, wherein the threshold valve and the main valve are axially bored and their axial bores are aligned to provide the pilot fluid path.

7. A shock absorber as recited in claim 1, wherein:

(a) the threshold valve and the main valve are poppet valves having a threshold poppet and a main poppet respectively; and (b) the threshold poppet and the main poppet are telescopically arranged so that the threshold poppet moves reciprocally and relatively within the main poppet.

8. A shock absorber as recited in claim 7, wherein the threshold poppet and the main poppet are axially bored and their axial bores are aligned to provide the pilot fluid path.

9. A shock absorber as recited in claim 8, wherein the front and back sides of the threshold valve and the main valve are sized, and the threshold valve and the main valve are biased, so that, when the variable orifice is substantially closed, increasing pressure in the first work chamber unseats the main poppet but not the threshold poppet and, when the variable orifice is not substantially closed, increasing pressure in the first work chamber first unseats the threshold poppet and then the main poppet.

10. A shock absorber as recited in claim 1, wherein the orifice modifier is a spool-type proportional valve and the remotely controlled actuator is a solenoid controlled by the one or more control signals.

11. A shock absorber for variably damping the transmission of forces between a body of a vehicle and a suspension member supporting a road wheel, the vehicle being of the type which has an apparatus for sensing one or more operating conditions and transmitting one or more control signals which are indicative of the operating conditions, the shock absorber comprising:

(a) a housing adapted for connection to one of the vehicle body and the suspension member and defining an internal space, and a piston adapted for connection to the other of the vehicle body and the suspension member and disposed within the internal space for dividing the internal space into a first working chamber and a second working chamber and for moving relative to the housing, the working chambers containing a working fluid;

(b) a first valve assembly adapted to control the flow of fluid from the first working chamber to a first receiving chamber, the first valve assembly having a front side subject to the pressure in the first working chamber and an opposite back side;

(c) a second valve assembly adapted to control the flow of fluid from the second working chamber to a second receiving chamber, the second valve assembly having a front side subject to the pressure in the first working chamber and an opposite back side;

(d) a first pilot fluid path from the front side of the first valve assembly to the back side;

(e) a second pilot fluid path from the front side of the second valve assembly to the back side;

(f) a pilot circuit providing fluid communication from the first pilot fluid path through a first variable orifice to the first receiving chamber and from the second pilot fluid path through a second variable orifice to the second receiving chamber;

(g) an orifice modifier apparatus adapted respectively to vary the size of the first variable orifice and the size of the second variable orifice, the orifice modifier apparatus being inversely ganged so that any orifice modifying operation both enlarges one of the first and second variable orifices and reduces the other of the first and second variable orifices;

(h) a remotely controlled actuator adapted to operate the orifice modifier apparatus, the actuator being controlled by the one or more control signals; and (i) means for providing for a complete circuit of the fluid among the working chambers and the receiving chambers;

(j) whereby varying the sizes of the first and second variable orifices varies the pressure on the back sides of the first and second valve assemblies and thereby varies the amount of pressure in the first and second working chambers respectively needed to open the first and second valve assemblies.

12. A shock absorber as recited in claim 11, wherein the orifice modifier apparatus is a single spool-type proportional valve having the structures to modify both the first variable orifice and the second variable orifice such that moving the spool in one direction enlarges one of the orifices and reduces the other and moving the spool in a reciprocal direction reduces the one of the orifices and enlarges the other.

13. A shock absorber as recited in claim 11, wherein the first and second receiving chambers are a reservoir.

14. A shock absorber as recited in claim 11, wherein the first receiving chamber is the second working chamber and the second receiving chamber is the first working chamber.

15. A shock absorber as recited in claim 11, wherein the first valve assembly comprises a first threshold valve and a first main valve adapted to act supplementarily and the second valve assembly comprises a second threshold valve and a second main valve adapted to act supplementarily.

16. A shock absorber as recited in claim 15, wherein the first threshold valve and the first main valve provide parallel first and second fluid paths to the first receiving chamber.

17. A shock absorber as recited in claim 15, wherein the first threshold valve and the first main valve are arranged coaxially.

18. A shock absorber as recited in claim 17, wherein the first threshold valve and the first main valve are axially bored and their axial bores are aligned to provide the first pilot fluid path.

19. A shock absorber as recited in claim 15, wherein:

(a) the first threshold valve and the first main valve are poppet valves having a first threshold poppet and a first main poppet respectively; and (b) the first threshold poppet and the first main poppet are telescopically arranged so that the first threshold poppet moves reciprocally and relatively within the first main poppet.

20. A shock absorber as recited in claim 19, wherein the first threshold poppet and the first main poppet are axially bored and their axial bores are aligned to provide the first pilot fluid path.

21. A shock absorber as recited in claim 20, wherein the front and back sides of the first threshold valve and the first main valve are sized, and the first threshold valve and the first main valve are biased, so that, when the first variable orifice is substantially closed, increasing pressure in the first work chamber unseats the first main poppet but not the first threshold poppet and, when the first variable orifice is not substantially closed, increasing pressure in the first work chamber first unseats the first threshold poppet and then the first main poppet.

22. A shock absorber as recited in claim 11, wherein the remotely controlled actuator is a solenoid controlled by the one or more control signals.

* * * * *